United States Patent [19]

Weh et al.

[11] Patent Number: 4,716,938
[45] Date of Patent: Jan. 5, 1988

[54] PRESSURE-TIGHT PLUG COUPLING

[76] Inventors: Erwin Weh; Wolfgang Weh, both of Siemensstrasse 5, D-7918 Illertissen, Fed. Rep. of Germany

[21] Appl. No.: 862,936

[22] Filed: May 14, 1986

[30] Foreign Application Priority Data

May 20, 1985 [DE] Fed. Rep. of Germany ....... 3518019
Oct. 16, 1985 [DE] Fed. Rep. of Germany ....... 3536916

[51] Int. Cl.$^4$ .................................................. F16L 37/28
[52] U.S. Cl. ............................ 138/93; 137/614.06; 285/102
[58] Field of Search .............. 138/89, 93; 285/34, 285/35, 102, 921, 306, 83, 101, 322, 323, 316; 73/49.8; 141/342; 137/614.06; 251/149.9

[56] References Cited

U.S. PATENT DOCUMENTS

| | | | |
|---|---|---|---|
| 1,995,377 | 3/1935 | Creveling | 141/385 |
| 3,757,836 | 9/1973 | Masuda | 285/35 |
| 3,978,892 | 9/1976 | Scodino | 138/89 |
| 4,394,874 | 7/1983 | Walter | 285/102 |
| 4,530,485 | 7/1985 | Yonker et al. | 251/297 |
| 4,543,995 | 10/1985 | Weh et al. | 137/614.06 |

Primary Examiner—Henry J. Recla
Assistant Examiner—L. J. Peters
Attorney, Agent, or Firm—Armstrong, Nikaido, Marmelstein & Kubovcik

[57] ABSTRACT

A plug coupling for providing a pressure-sealed connection to a device provided with a connecting member comprising a cylindrical housing; a piston shiftable within the housing clamping jaws connected to the piston and concentrially arranged around the longitudinal axis of the housing and radially displaceable by means of a ramp arrangement by an axial movement of the piston relative to the housing; pressure is applied to said piston for moving it in longitudinal direction of the housing thereby pressing the clamping jaws radially inwards or outwards by means of said ramp arrangement. The free ends of the clamping jaws are moved into an engaging position for engagement with said connecting member.

25 Claims, 10 Drawing Figures

PRESSURE-TIGHT PLUG COUPLING

FIELD OF THE INVENTION

The invention relates to a pressure-tight plug coupling for providing a pressure-sealed connection to a device provided with connecting means. Such plug couplings are of particular use for a fast and one-handed application to and removal from a connector provided at a device of use. Exemplary, pressure sensitive elements may be tested by momentary application of a pressurized medium by means of a plug coupling.

BACKGROUND OF THE ART

In our U.S. Pat. No. 4,543,995, corresponding to the International patent application WO No. 84/02566 we have disclosed a plug coupling of the type definded before comprising a cylindrical housing, a piston shiftable within said housing and having formed at its front end clamping jaws extending out of said housing and radially displaceable via a ramp arrangement upon axial movement of the piston relative to the housing the movement being effected by selectively connecting a pressure source to one of various compartments formed between the inner surface of the housing and the piston by shifting a sleeve along the outer surface of the housing. Though such a plug coupling is easy and fast to handle and operates safely, the sleeve surrounding the housing has a relatively large outer diameter which makes it difficult to use the coupling in cases of closely arranged connections. Furthermore, providing the various radial bores is complicated and several sealings are required for sealing the various compartments against each other.

The U.S. Pat. No. 2,388,179 discloses a plug coupling using clamping jaws which may be radially widened, but are fixed to a tube. After inserting of a threaded connection the clamping jaws are pressed radially inward by a sleeve which is shiftable along the tapered outer surfaces of the clamping jaws. Such a plug coupling cannot be used one-handed. Furthermore, it is necessary to turn the coupling for getting a pressure-tight connection. According to a further aspect the clamping jaws of the plug coupling according to U.S. Pat. No. 4,543,995 are unitary with the piston which requires a relatively thin transition between the piston and clamping jaws which have to be resilient. Thus, there is a tendency of breakage of the clamping jaws at the transition point upon heavy use of the coupling. Furthermore, a certain force is necessary to overcome the resiliency of the clamping jaws when pressing them together.

SUMMARY OF THE INVENTION

It is an object of the present invention to provide a plug coupling having a simplified design. It is another object of the invention to provide a plug coupling having a reduced outer diameter. It is a further object of the invention to provide a plug coupling which may easily be adapted to various different connectors. A still further object of the invention is to provide a plug coupling having a longer life time. Still a further object of the invention is to provide a plug coupling which needs a reduced force application.

These and other objects of the invention are accomplished by a plug coupling for providing a pressure-sealed connection to a device provided with connecting means comprising a cylindrical housing, a piston shiftable within said housing, clamping jaws connected to said piston and concentrically arranged around the longitudinal axis of said housing and radially displaceable by means of a ramp arrangement by an axial movement of the piston relative to the housing, a means for applying pressure to said piston for moving it in longitudinal direction of said housing thereby pressing said clamping jaws radially inwards by means of a said ramp arrangement and a spring means biasing said piston against said pressure means.

According to another aspect of the present invention a plug coupling for providing a pressur-sealed connection to a device provided with connecting means comprises a cylindrical housing, a piston shiftable within said housing, a plurality of clamping jaws concentrically arranged about a longitudinal axis of said housing and engaging a front portion of said piston for longitudinal movement therewith, free ends of said clamping jaws being radially displaceable via a ramp arrangement during movement of said piston in an outward direction of said longitudinal axis in respect of said housing, and a means for applying pressure to said piston in order to move said clamping jaws in either of a connected and a disconnected position.

DESCRIPTION OF THE PREFERRED EMBODIMENTS OF THE INVENTION

Since we have described in detail the principal elements of the plug coupling in our U.S. Pat. No. 4,543,995 the following description relates on the main to the modified elements of the new plug coupling which exemplary may serve for a connection to a connecting member of any kind of device.

Figure 1:
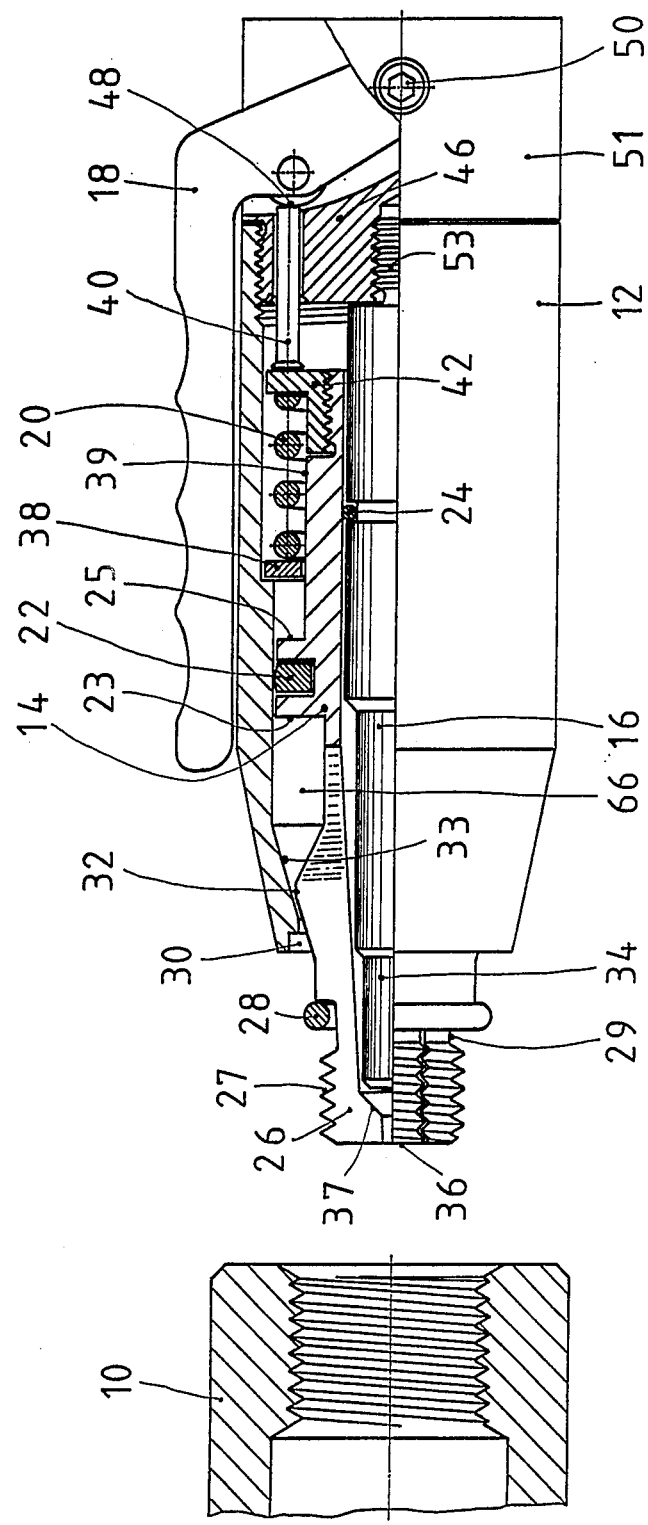
FIG. 1 is an elevational, partially sectional view of a first embodiment of a plug coupling explaining the situation where the coupling may be inserted into a threaded opening.

FIG. 1 shows a housing 12 in which a piston 14 sealed by a sealing 22 against the housing 12 is shiftable in the direction of the longitudinal axis of the housing relative thereto on a core 16 sealed in respect of the piston 14 by a further sealing 24. The front opening of the housing 12 is tapered such that an inner ramp 33 is formed.

The front end of the piston 14 is subdivided into a plurality of clamping jaws 26, preferably 6 which are resilient in radial direction. With the embodiment the clamping jaws 26 are provided with an outer threading 27 at their free ends. The exterior surface of the clamping jaws are provided with ramps 32 engaging the ramps 33 formed at the inner surface of the housing 12. Thus, the ramps 32 slide on the ramp 33 and the clamping jaws 26 are pressed together when the piston 14 is moved to the left (FIG. 1) out of the housing 12.

Between the threading 27 and the ramps 32 there is an annular recess 29 into which a third sealing 28 is inserted which fits with its outer peripheral surface into an annular recess 30 at the end face of the housing 12.

The sealing 22 is inserted preferably in the middle of the length of the piston between two annular flanges 23 and 25. A locking ring 38 engages an inner rim of the housing 12 through which locking ring the piston 14 slides with a cylindrically recessed portion 39 when moved in longitudinal direction. The rear end of the piston 14 is provided with an end face flange 42. In the space between the locking ring 38 and the flange 42 a spiral spring 20 is provided which tends to move the piston into the interior of the housing 12. A rod 40 pressed against the outer end face of the flange 42 by a hand lever 18 via a roll 48 acts against the pressure of the spiral spring 20. The hand lever 18 is pivotally mounted at the housing 12 at a point 50.

Specifically, the housing is closed at its rear end by a threaded member 51 through which the rod 40 is inserted and which is provided with pivotal point 50. In a central bore 53 of the threaded member the central core 16 is screwed in, whose front end 34 is formed cylindrically and extends into the front region of the clamping jaws 26. These clamping jaws 26 are provided at their inner surfaces with ramps 37 and an opening 36. Upon the movement of the piston 14 into the housing 12 the ramps 37 slide at the face edge of the cylindrically front end portion 34 of the core 16. Thus, the clamping jaws 26 are positively widened in radial direction and locked in the end position of the piston 14 in which position the front end 34 is located in the opening 36. In this position the third sealing 28 is located in the recess 30 ( viz.FIG. 2).

Figure 2:
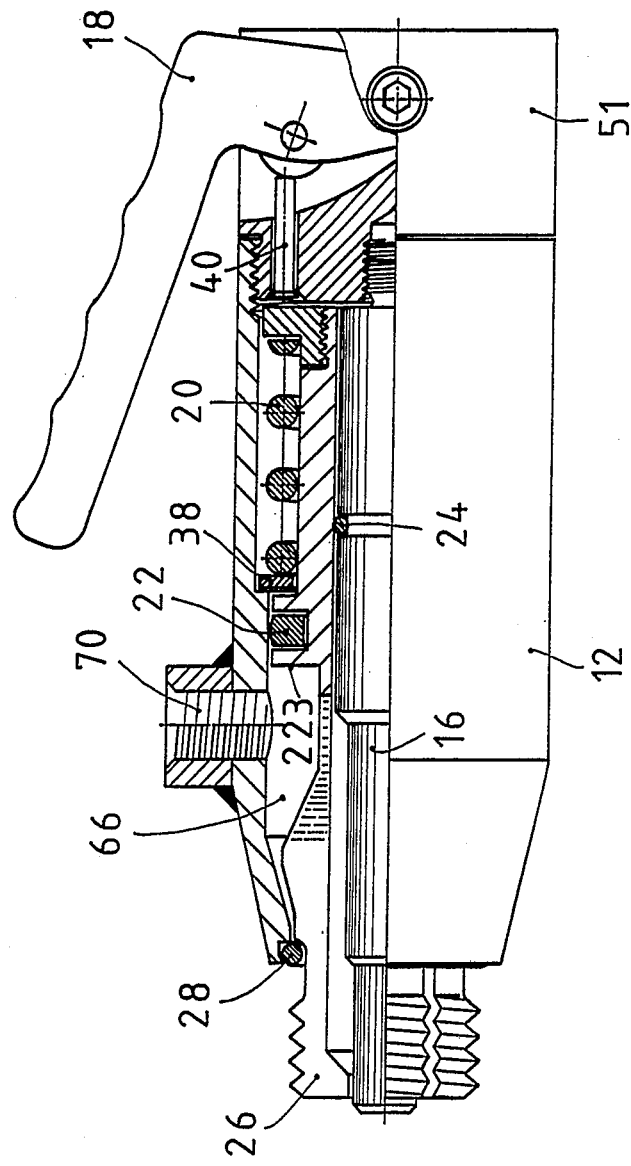
FIG. 2 is a view similar to that of FIG. 1 illustrating a modification of the first embodiment of the coupling according to the invention in the connected situation.

The operation of the plug coupling according to the first embodiment is as follows:

In the situation according to FIG. 1 the hand lever 18 is pressed against the outer surface of the housing 12 and the piston 14 is in a position where its front end bearing the clamping jaws 26 is urged out of the housing 12. As may be seen from FIG. 1 the clamping jaws 26 are pressed radially inwards in view of the co-operation of the ramps 32 and 33. The coupling is now inserted into a plug provided with an inner threading to such an extent that the face end of the plug approximately engages the sealing 28. Releasing of the hand lever 18 causes its rocking away from the outer surface of the housing 12 as illustrated in FIG. 2 by the pressure of the spiral spring 20. In this position the clamping jaws 26 are maintained in their widened position tightly engaging the inner threading of the plug (not shown). The third sealing 28 is pressed into the recess 30 which results in a pressure tight connection. It may be appreciated, that such a connection may be made within an extremely short time. Also, the connection may be released immediately by pressing hand lever 18 again.

Whilst the first embodiment according to FIG. 1 explains the use of a coupling according to the invention as a momentary plug for closing a threaded opening the modification according to FIG. 2 explains a coupling where an inlet 70 preferably provided with a threading is attached preferably perpendicular to the longitudinal axis of the coupling near the front end of the housing 12 such that a space 66 provided between the first sealing 22 and the third sealing 28 may be supplied with a pressurized fluid preferably hydraulic liquid for application of that fluid to a device, for instance, for test purposes upon connecting the coupling to a threaded opening of the device to be tested alternatively, the fluid may be gaseous.

Figure 3:
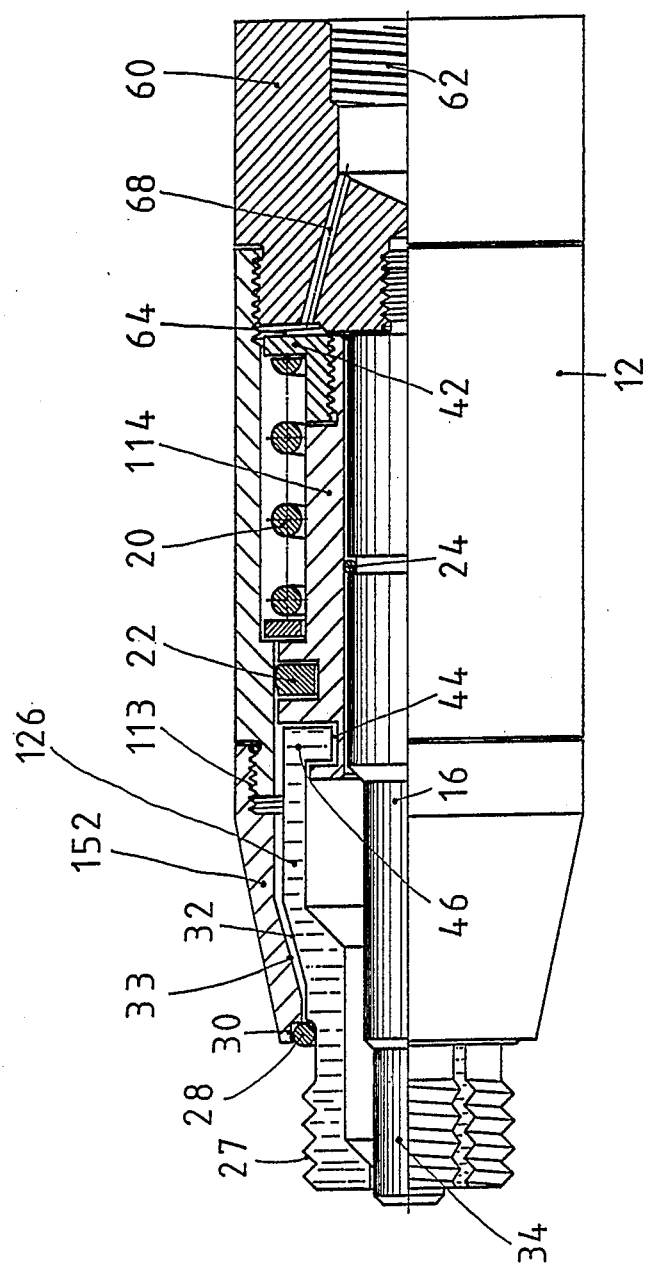
FIG. 3 is a view similar to that of FIG. 1 of a second embodiment of the plug coupling according to the invention again in connected position.

FIG. 3 shows a second embodiment of the coupling according to the invention where the hand lever 18 is replaced by a pressure source (not shown) which may be connected to the coupling through a threaded opening 62 provided in an end member 60 attached at the rear end of the housing 12. The end member 60 is provided with a passage 68 such that upon application of pressure a face 64 of the flange 42 has pressure applied thereto. Consequently, a piston 114 is shifted from the position shown in FIG. 3 to the left into a position as shown in FIG. 1. Upon removal of the pressure the spiral spring 20 returns the piston 114 into the position according to FIG. 3. Application and removal of pressure may be accomplished by a pedal switch. Thus, the attaching and removal of the coupling may be done in an extremely short time. It should be noted that the inlet 70 shown in FIG. 2 may be provided as well for the coupling of the second embodiment.

Furthermore, whilst the first and second embodiments show a connection using clamping jaws for inner threadings the arrangement may be such as explained in W0 No. 84/02566 for a connection to an opening provided with an outer threading.

Also, the coupling according to the invention is not only applicable for connection by a threading but for any other connector. In this case it is only necessary to adapt the clamping jaws in particular their free ends for an appropriate engagement. For instance, the clamping jaws may be provided at their free ends with radial extension which grip behind an annular rim provided at the face of the member to which the coupling should be connected. Thus, with the piston 114 moving inwards the rim is tightly pressed against the third sealing 28 at the face edge of the housing 12.

The second embodiment of the invention is provided with further favourable features. As may be seen from FIG. 3 a front part 152 of the housing may be exchangable by means of threadings 113. Thus, it may be easily replaced by a different front part 152 adapted at its front end to a different connecting member.

Furthermore, clamping jaws 126 are not unitary with the piston 114. Rather, the clamping jaws 126 are individual elements which are in engagement with the piston 114 such that they have restricted free movement in radial direction whilst there is a minimum movement in longitudinal direction in respect of the piston 114. With such a design the clamping jaws need not be resilient and it is possible to harden them to rockwell values scale C, even above 50. Furthermore, there is no need of applying larger forces for pressing the clamping jaws together. Also, there is no relatively weak transition between the piston 14 and the clamping jaws 26 as in FIG. 1 which tends to break after heavy use.

Figure 4A:
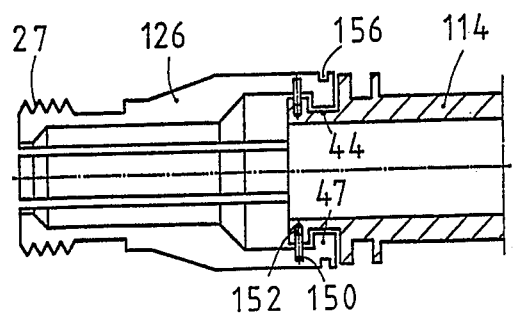
FIGS. 4a and 4b are elevational sectional views of modified inner parts of the second embodiment.
Figure 4B:
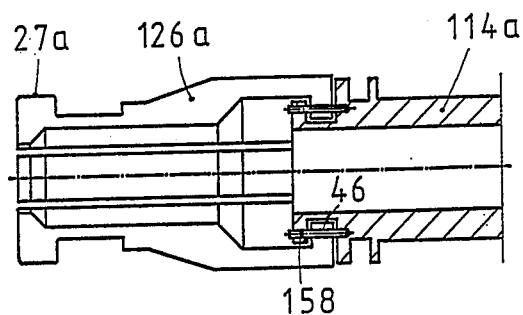
Figure 5:
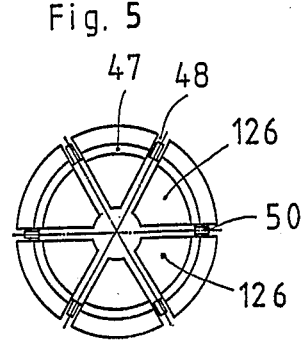
FIG. 5 a schematic diagram in front view for illustrating the mounting of the clamping jaws of the second embodiment.

The FIGS. 4a and 4b show a preferred design for connecting the individual clamping jaws 126 to the piston 114. Specifically, the rear ends of the clamping jaws are provided with segmented, hooklike inwardly extending projections 47 (see also FIG. 5) which engage an anular recess 44 provided at the outer periphery of the front end of the piston 114. As may be seen from FIG. 5 the projections 47 of the clamping jaws 126 are arranged in a circle and kept apart by studs 50 arranged in gaps 48 between the individual segments. It may be appreciated that there is no or little movement in longitudinal direction. On the other hand it may be seen from FIG. 3 that there is some radial movement possible which is restricted by the inner surface of the housing 12 such that the segmented jaws 126 are prevented from hooking out of the recess 44. Thus, the front ends of the clamping jaws are free to be moved radially inwardly and outwardly without any biasing spring action.

Various further constructions of the coupling region between the clamping jaws and the piston are available to a person skilled in the art. The main point is that the clamping jaws 126 and the piston 114 are connected to each other such that there is a certain mobility in radial direction whilst there is no or little mobility in longitudinal direction between the two elements. Exemplary, the clamping jaws 126 might overlie the piston 114 and may be connected by radial pins to the latter. Alternatively, the rear ends of the clamping jaws may be provided with radially extending parts which are losely fixed to the front end face of the piston 114.

FIG. 4a illustrates clamping jaws 126 which are secured to the piston 114 against movement in peripheral direction by pins 150 extending radially in radial holes 152 provided in the front ends of the piston 114 and holes 154 provided at the inner side of the clamping jaws 126. The clamping jaws 126 are further secured against a radial movement of their rear ends by an O-ring 156.

FIG. 4b shows a modification of the connection between the clamping jaws 126a and a piston 114a. With this embodiment pins 158 extending parallel to the longitudinal axis pass through respective holes provided at the front end of the piston 114a and the inward projections 46 provided at the rear ends of the clamping jaws 126a.

It should be noted that with many types of connections between the clamping jaws and the piston an easy changing of the jaws is possible. Also, the seperation between the clamping jaws and the piston may be applied to all embodiments of WO No. 84/02566 and the first embodiment of the present invention.

FIG. 4b illustrates that the clamping jaws 126 having a threading 27 may be easily replaced by clamping jaws 126a having a different threading 27a.

Figure 6:
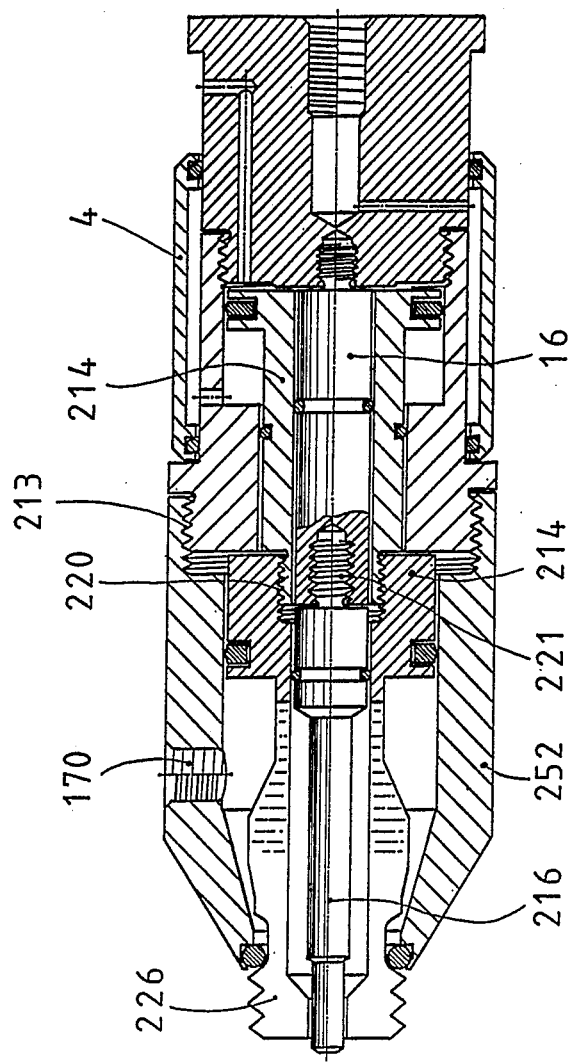
FIG. 6 a sectional elvational view of a third embodiment of the plug coupling according to the invention.

FIG. 6 shows a third embodiment of the present invention using a shiftable sleeve 4 for air pressure application as explained in detail in our U.S. Pat. No. 4,543,995 for operating the coupling according to the invention by shifting the piston 214 forth and back by applying air pressure onto different sides of the piston 214. With this embodiment similar to the first embodiment modified according to FIG. 2 it is possible to apply a pressurized fluid through an opening 170 to the connected device. Also, with this third embodiment the front parts are easy exchangable, in particular a front portion 252 of the housing, a front part 216 of the core 16 and a front part 214 having formed at its front end clamping jaws 226. Preferably these releasable connections are threadings 213, 220 and 221.

It should be noted that it would be possible with the second embodiment to insert an air pressure sleeve design according to our U.S. Pat. No. 4,543,995 between an air pressure source and the end member 60 of the coupling according to FIG. 3. This would enable a one-hand-operation of the coupling without any foot control of the air pressure source.

Again it should be noted that as mentioned in connection with the first and second embodiments all couplings may be designed such that they are applicable for connections with outer threadings, inner threadings or other connecting designs.

Figure 7:
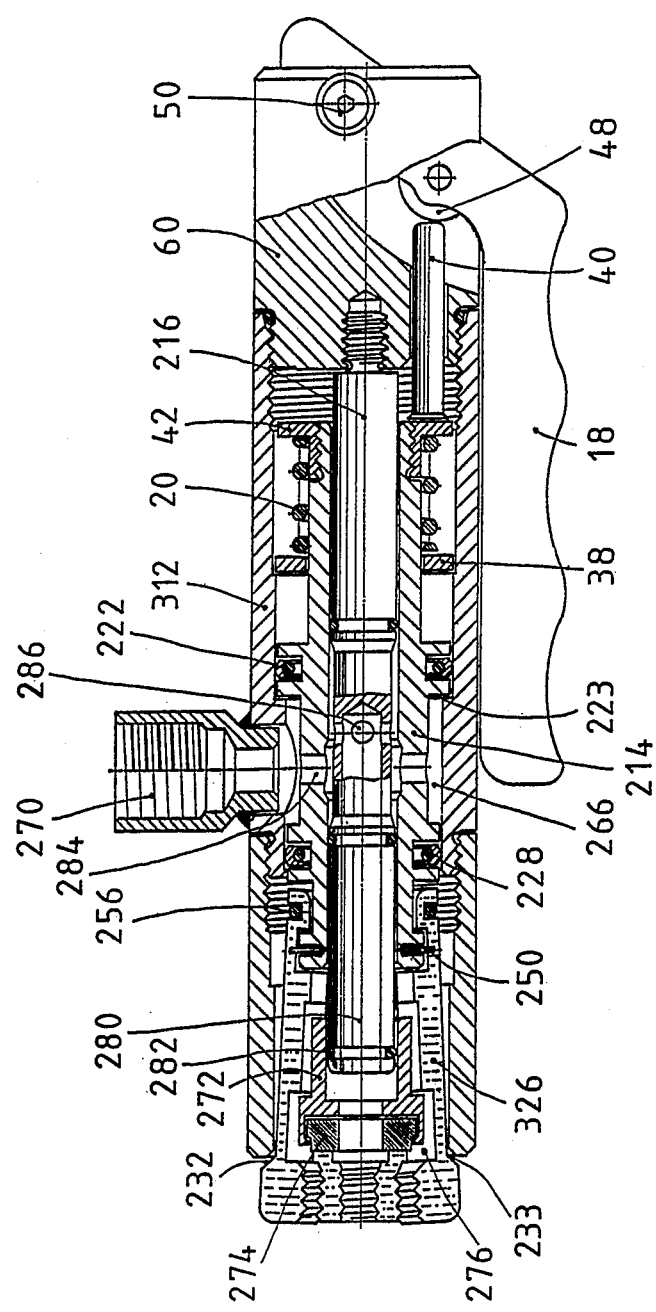
FIG. 7 a sectional elevational view of a fourth embodiment of the plug coupling according to the invention.

FIG. 7 illustrates a fourth embodiment of a plug coupling according to the invention adapted for use with external threaded connections. In principle, the plug coupling of the fourth embodiment is similar to that explained in connection with FIG. 2. Thus, for similar parts similar reference numerals are used. With the fourth embodiment a core 216 is provided with a central bore 280 at its front part. Radial holes 286 connect the central bore 280 to a cylindrical space 266 via further radial holes 284 provided in middle part of piston 214. The space 266 may be supplied from a fluid source through connecting member 270.

Clamping jaws 326 are connected to the front end of the piston 214 in a manner similar to that of FIG. 4a using an O-ring 256 for maintaining the clamping jaws together which are secured to the front end of the piston 214 by radial pins 250.

A recessed space 276 between the inner surface of the clamping jaws and the front part of the core 216 is occupied by sealing support member 272 supporting a front face sealing 274. The space 276 is of such a size that it permits a restricted longitudinal movement of the sealing support member relative to the clamping jaws 326. The closing and opening of clamping jaws 326 is accomplished by the ramp arrangement 232,233 during inward movement of the piston 214 into the housing 312. A sealing 282 is provided between the external front end of the core 216 and the inner cylindrical surface of the sealing support member 272.

In operation, when pressing the handle 18 into the position shown in FIG. 7 the piston 214 is moved relative to the housing 312. Upon this movement the clamping jaws 326 are released from the clamping arrangement 232,233 and will open by radial displacement in view of the tension provided by the O-ring 256. The sealing support member 272 is moved together with the clamping jaws 326. Now, the coupling is brought into engagement with the desired connection the sealing 274 contacting the front face of the connection.

When releasing handle 18 the spring 20 moves the piston 214 back into the housing 312 the ramp arrangement 232, 233 closing the clamping jaws positively. In the inner end position the core front face urges the sealing support members 272 and the sealing 274 against the front face of the connection.

Now, when fluid preferably an hydraulic oil or air is supplied via connecting member 270 to space 266 this fluid is passed through the central board 280 to the connected device. Simultaneously a pressure is exerted to the flange 223. Thus this fluid pressure supplements the action of the spring 20 to maintain the plug coupling in the closed position. For release the fluid supply is stopped and the handle 18 is again pressed into the position shown in FIG. 7.

Figure 8:
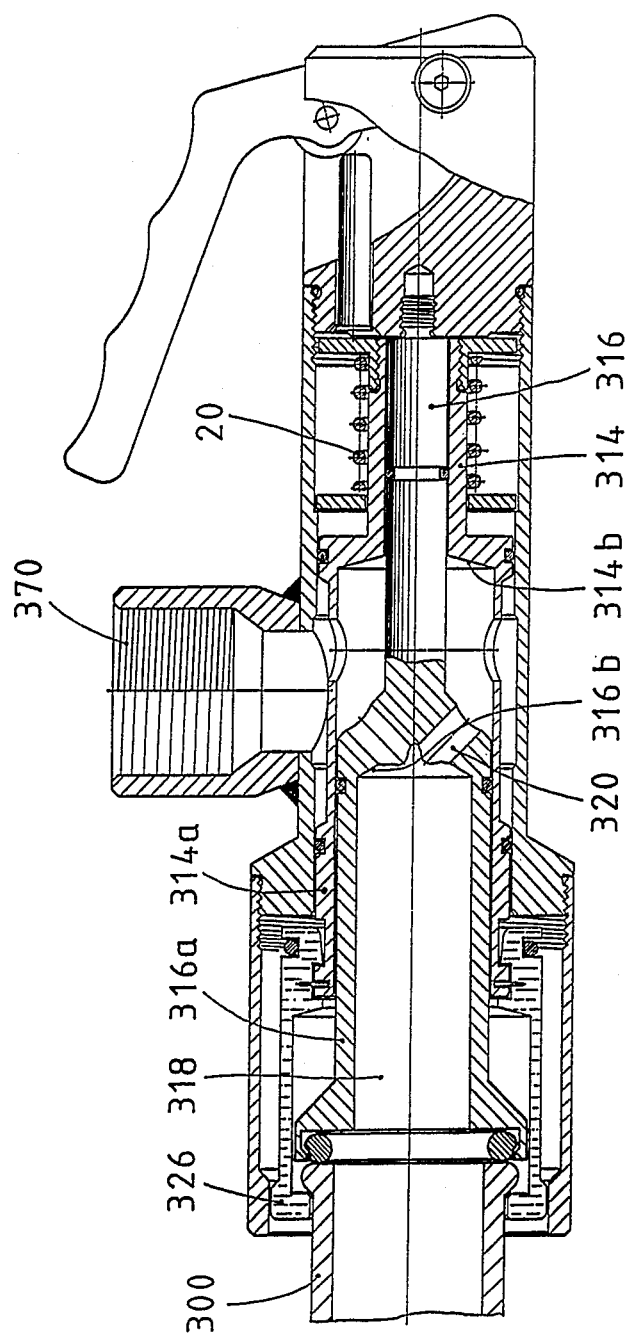
FIG. 8 a sectional elevational view of plug coupling according to the invention as a modification of the plug coupling according to FIG. 7.

In a modification of the fourth embodiment of FIG. 7 the supply of fluid to the connected device is considerably increased by a design according to FIG. 8 with this modified embodiment a core 316 has a considerably enlarged front part 316a such that a cylindrical concentrical opening 318 therein has a diameter in the range of the connection 300 in a conical transitional part 316b between the rear part of the core 316 and its front part 316a relatively large openings 320 are provided for passing a large quantity of fluid from a connecting member 370 to the opening 318.

A further transition between the rear part of the piston 314 and its front part 314a offers a large pressure area 314b for tightly fixing the arrangement in the closed position.

Figure 9:
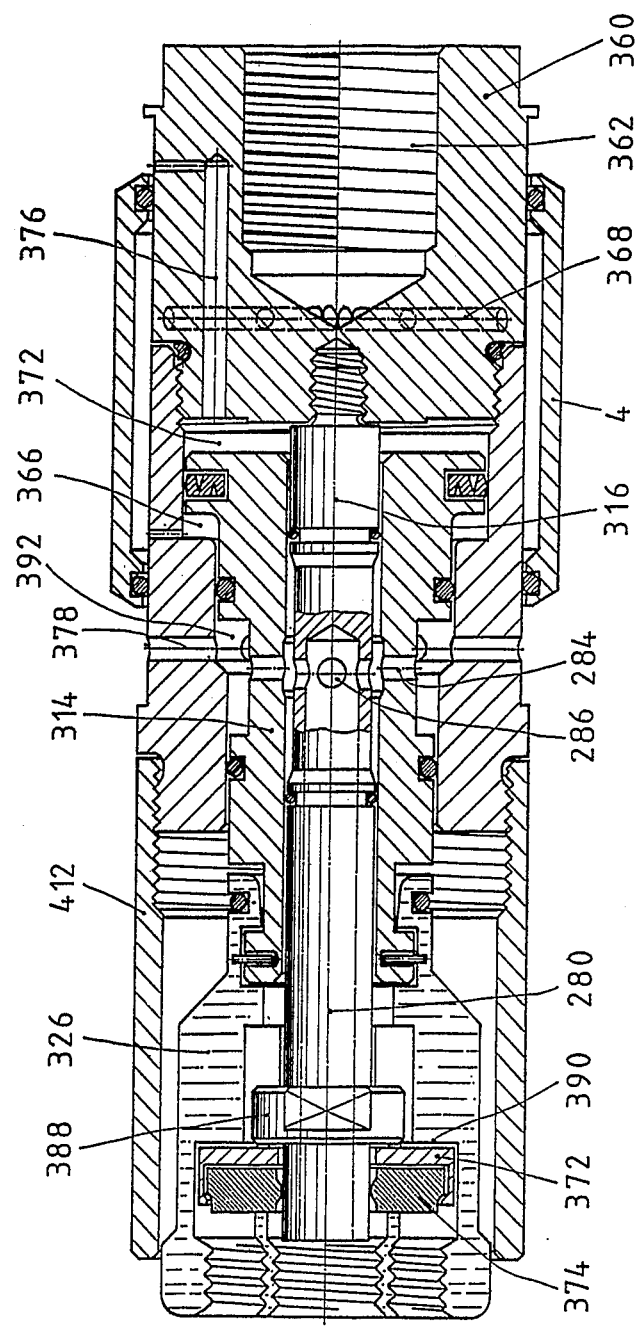
FIG. 9 a sectional elevational view of a fifth embodiment of the plug coupling according to the invention.

FIG. 9 shows a further embodiment of the plug coupling according to the invention using a clamping jaws and piston arrangement according to FIG. 4a and a control by means of sleeve 4 according to the embodiment of FIG. 6. The front part corresponse to that of the device according to FIG. 7 with some slight modifications.

FIG. 9 shows a situation where the clamping jaws 326 are not yet fully housed in a housing 412 but shortly before the final closing position.

Compared with the device according to FIG. 7 the core 218 is extended through a connection sealing 374 secured to a sealing support member 372 which in the open condition abuts with its rear side against an annular radial surface 390 of the clamping jaws 326. In the closed position the sealing support member 372 engages a stop 388 whereby the connection sealing 374 is tightly pressed against the connection member (not shown). The central opening of the sealing 374 is of such a diameter that it tightly fits onto the outer surface of the core 280. As regards the operating part of the plug coupling a fluid preferably air is applied through a central threaded bore 362 in a rear member 360. The bore 362 is connected through radial ducts to the outer surface of the rear member 360 covered by the sleeve 4. Depending on the position of the sleeve 4 air is then passed either to a pressure chamber 366 for moving the piston 314 and the clamping jaws 326 into the housing 412 or via a duct 376 to a pressure chamber 372 in order to move the clamping jaws 426 out of the housing 412 or through a duct 378 (as shown) to a chamber 392 which is connected to the central bore 280 of the core 316 through the wholes 284 and 286 as described in connection with FIG. 7. In this situation as shown in FIG. 9 pressure is still supplied to the pressure chamber 366 thus that the piston 314 is still displaced until the clamping jaws 326 are essentially (but not fully) within the housing 412.

In the forgoing description various embodiments of plug couplings have been explained having different operating and connecting units. It should be noted that every operating unit as the sleeve operated unit, the handlever operated unit and the pressure and spring operated unit may be combined with different connection units adapted for a connection with internal or external threads or any other desired tight sealing connection as exemplary shown in FIG. 8.

Exemplary, it would be possible with the plug coupling of the second embodiment to insert an air pressure sleeve design according to our U.S. Pat. No. 4,543,995 between an air pressure source and an end member 60 of the coupling according to FIG. 3. This would enable a one-hand operation of the coupling without any foot control of the air pressure source.

It should be noted that the term "pressure" should be understood in a broader sense including for instance the application of a force exerted by spring.

We claim:

1. A plug coupling for providing a pressure-sealed connection to a device provided with threaded connecting means having a front face surface comprising:
   a cylindrical housing provided at an open front side, with a surface corresponding to that of said connecting means, and having a rear side closed by closure member;
   a core element axially extending in said housing having a rear end fixed to said closure member and having a front end extending into the region of the face surface of the housing;
   a piston means within said housing slidably mounted on the core element for axial movement;
   elongated clamping jaws having first ends linked to a front portion of said piston, and extending in a generally axial direction, said clamping jaws being concentrically arranged around a longitudinal axis of said housing and having free second ends radially displaceable;
   ramp means for rocking said clamping jaws about joints between said first ends of said clamping jaws and said front portion of said piston upon an axial movement of said piston;
   means for applying pressure to said piston for moving it in said axial direction of said housing thereby pressing said clamping jaws radially inwards by means of a ramp arrangment and axial movement thereof toward said front end of said housing for displacing said free ends of said clamping jaws by an engagement thereof with said ramp means into a radial position permitting a threading provided at said free ends of said clamping jaws to be placed in radial jaxtaposition to a threading of said threaded connecting means;
   a spring means biasing said piston against the pressure of said pressure means and moving said piston toward said rear end of said housing upon release of the pressure of said pressure means;
   a means for positively engaging said threading of said free ends of said clamping jaws into said threaded connecting means and positively maintaining an engagement of said clamping jaws with said threading of said connecting means upon movement of said piston toward said rear end of said housing; and sealing means provided for engagement with said face surface of said front end of said housing and for pressure-tight sealing engagement to said face surface of said threaded connecting means upon movement of said piston toward said rear end of said housing.

2. The plug coupling of claim 1 wherein said spring means is a spiral spring means wound around a rear portion of said piston.

3. The plug coupling of claim 1 wherein said pressure means is a hand lever pivotally mounted at said housing and acting upon said piston in longitudinal direction of said housing.

4. The plug coupling of claim 1 wherein said pressure means is a gaseous pressure means connectable to a rear end of said housing and provided with a closure member for selectively applying gaseous pressure against a rear end of said piston.

5. The plug coupling of claim 1 wherein front portions of said plug coupling are easily exchangable.

6. The plug coupling of claim 5 wherein a front portion of said housing is in threaded connection to a main body of said housing.

7. The plug coupling of claim 5 wherein said clamping jaws are releaseable connected to said piston.

8. The plug coupling of claim 7 wherein said clamping jaws are in a hooked-in connection to said piston.

9. The plug coupling of claim 7 wherein said clamping jaws are formed as relatively rigid parts with an increased hardness.

10. The plug coupling of claim 1 wherein said housing is provided near a front portion with a connecting means for applying a pressurized fluid.

11. The plug coupling of claim 1 wherein said spring means is arranged between a locking ring supported by an annular rim provided at an inner surface of said housing and a flange formed at a rear end of said piston.

12. The plug coupling of claim 1 wherein said ramp arrangement is provided between an outer peripheral surface of said clamping jaws and an inner surface of said housing.

13. The plug coupling of claim 1 wherein said clamping jaws are provided with threadings at the exterior of front parts thereof.

14. The plug coupling of claim 1 wherein said clamping jaws are provided with threading at the interior of front parts thereof.

15. A plug coupling for providing a pressure-sealed connection to a device provided with connecting means having a front face surface comprising:
   a cylindrical housing provided, at an open front side, with a surface corresponding to that of said connecting means, and having a rear side closed by a closure member;
   a piston means slideably mounted on the core element for axial movement within said housing;
   a core element axially extending in said housing having a rear end fixed to said closure member and having a front end extending into the region of the face surface of the housing;
   elongated clamping jaws having first ends linked to a front portion of said piston, and extending in a generally axial direction, said clamping jaws being concentrically arranged about a longitudinal axis of said housing and having free second ends of said clamping jaws radially displaceable;
   ramp means for rocking said clamping jaws about joints between said first ends of said clamping jaws and said front portion of said piston upon an axial movement of said piston;
   means for applying pressure to said piston axial movement thereof toward said front end of said housing for displacing said free ends of said clamping jaws by an engagement thereof with said ramp means into a radial position permitting said free ends of said clamping jaws to be placed in radial juxtaposition to said connecting means;
   a spring means for moving said piston toward said rear end of said housing upon release of the pressure of said pressure means
   a means for positively urging said free ends of said clamping jaws into radial engagement with said connecting means and positively maintaining a radial engagement of said clamping jaws with said connecting means upon movement of said piston toward said rear end of said housing; and
   sealing means provided for engagement with said face surface of said front end of said housing and for pressure-tight sealing engagement to said face surface of said connecting means upon movement of said piston toward said rear end of said housing.

16. The coupling of claim 15 wherein said housing is provided near a front portion with a connecting means for applying a pressurized fluid.

17. The plug coupling of claim 15 wherein said ramp arrangement is provided between an outer peripheral surface of said clamping jaws and an inner surface of said housing.

18. The plug coupling of claim 15 wherein said clamping jaws are provided with engaging means at the exterior of front parts thereof.

19. The plug coupling of claim 15 wherein said clamping jaws are provided with engaging means at the interior of front parts thereof.

20. The plug coupling of claim 15 wherein a front portion of said housing is in threaded connection to a main body of said plug coupling.

21. A plug coupling for providing a pressure-sealed connection to a device provided with connecting means comprising:
   a cylindrilcal housing,
   a piston shiftable within said housing,
   clamping jaws, connected to a front portion of said piston concentrically arranged around longitudinal axis of said housing and having free ends radially displaceable by means of a ramp arrangement upon an axial movement of said piston in an axial direction in said housing,
   a hand lever pivotally mounted at said housing and acting upon said piston for moving it in said axial direction of said housing thereby pressing said clamping jaws radially by means of said ramp arrangement;
   a spring means biasing said piston against said pressure means; and
   a means for moving said free ends of said clamping jaws in an engaging position for engagement with said connecting means.

22. A plug coupling for providing a pressure sealed connection to a device provided with a connecting means having a front face surface comprising:
   a cylindrical housing provided, at an open front side, with a surface corresponding to that of said connecting means, and having a rear side closed by a closure member;
   a core element axially extending in said housing having a rear end fixed to said closure member and having a front end extending into the region of the face surface of the housing;
   a piston means slideably mounted on the core element for axial movement within said housing;
   elongated clamping jaws extending from a front portion of said piston, in a generally axial direction, said clamping jaws being concentrically arranged around a longitudinal axis of said housing and having free ends radially displaceable by means of a ramp arrangement upon an axial movement of the piston in;
   means for applying pressure to said piston for axial movement thereof toward said front end of said housing for displacing said free ends of said clamping jaws by an engagement thereof with said ramp means into a radial position permitting said free ends of said clamping jaws to be placed in radial juxtaposition to said connecting means;
   a spring means for moving said piston toward said rear end of said housing upon release of the pressure of said pressure means;

a means for positively urging said free ends of said clamping into radial engagement with said connecting means and positively maintaining a radial engagement of clamping jaws with said connecting means upon movement of said piston toward said rear end of said housing; and sealing means provided for engagement with said face surface of said front end of said housing and for pressure-tight sealing engagement to said face surface of said connecting means upon movement of said piston toward said rear end of said housing; and a lateral supply connection at a front part of said housing for supply a pressurized liquid to said connecting means.

23. A plug coupling for providing a pressure-sealed connection to a device provided with connecting means having a front face surface comprising:

a cylindrical housing provided, at an open front side, with a surface corresponding to that of said connecting means, and having a rear side closed by a closure member;

a piston means slideably mounted on the core element for axial movement within said housing;

a core element axially extending in said housing having a rear end fixed to said closure member and having a front end extending into the region of the face surface of the housing;

elongated clamping jaws having first ends linked to a front portion of said piston, and extending in a generally axial direction, said clamping jaws being concentrically arranged about a longitudinal axis of said housing and having free second ends of said clamping jaws radially displaceable;

ramp means for rocking said clamping jaws about joints between said first ends of said clamping jaws and said front portion of said piston upon an axial movement of said piston;

means for applying pressure to said piston for axial movement thereof toward said front end of said housing for displacing said free ends of said clamping jaws by an engagement thereof with said ramp means into a radial position permitting said free ends of said clamping jaws to be placed in radial juxtaposition to said connecting means;

a means for moving said piston toward said rear end of said housing upon release of the pressure of pressure means;

a means for positively urging said free ends of said clamping jaws into radial engagement with said connecting means and positively maintaining a radial engagement of said clamping jaws with said connecting means upon movement of said piston toward said rear end of said housing; and sealing means provided for engagement with said face surface of said front end of said housing and for pressure-tight sealing engagement to said face surface of said connecting means upon movement of said piston toward said rear end of said housing;

said clamping jaws being hooked-in with their rear ends in a peripheral recess of said piston.

24. A plug coupling for providing a pressure-sealed connection to a device provided with connecting means having a front face surface comprising;

a cylindrical housing provided, at an open front side, with a surface corresponding to that of said connecting means, and having a rear side closed by a closure member;

a piston means slideably mounted on the core element for axial movement within said housing;

a core element axially extending in said housing having a rear end fixed to said closure member and having a front end extending into the region of the face surface of the housing;

elongated clamping jaws having first ends linked to a front portion of said piston, and extending in a generally axial direction, said clamping jaws being concentrically arranged about a longitudinal axis of said housing and having free second ends of clamping jaws radially displaceable., ramp means for rocking said clamping jaws about joints between said first ends of said clamping jaws and said front portion of said piston upon an axial movement of said piston;

means for applying pressure to said piston for axial movement thereof toward said front end of said housing for displacing said free ends of said clamping jaws by an engagement thereof with said ramp means into a radial position permitting said free ends of said clamping jaws to be placed in radial juxtaposition to said connecting means;

a means for moving said piston toward said rear end of said housing upon release of the pressure of pressure means;

a means for positively urging said free ends of said clamping into radial engagement with said connecting means and positively maintaining a radial engagement of said clamping jaws with said connecting means upon movement of said piston toward said rear end of said housing; and sealing means provided for engagement with said face surface of said front end of said housing and for pressure-tight sealing engagement to said face surface of said connecting means upon movement of said piston toward said rear end of said housing said clamping jaws being formed as segments and are provided with radially inward projected flanges engaging an annular recess formed on an outer surface of said piston.

25. A plug coupling for providing a pressure-sealed connection to a device provided with connecting means having a front face surface comprising:

a cylindrical housing provided, at an open front side, with a surface corresponding to that of said connecting means, and having a rear side closed by a closure member;

a piston means slideably mounted on the core element for axial movement within said housing;

a core element axially extending in said housing having a rear end fixed to said closure member and having a front end extending into the region of the face surface of the housing;

elongated clamping jaws having first ends linked to a front portion of said piston, and extending in a generally axial direction, said clamping jaws being concentrically arranged about a longitudinal axis of said housing and having free second ends of said clamping jaws radially displaceable;

ramp means for rocking said clamping jaws about joints between said first ends of said clamping jaws and said front portion of said piston upon an axial movement of said piston;

means for applying pressure to said piston for axial movement thereof toward said front end of said housing for displacing said free ends of said clamping jaws by an engagement thereof with said ramp means into a radial position permitting said free ends of said clamping jaws to be placed in radial juxtaposition to said connecting means;

a means for moving said piston toward said rear end of said housing upon release of the pressure of pressure means;

a means for positively urging said free ends of said clamping jaws into radial engagement with said connecting means and positively maintaining a radial engagement of said clamping jaws with said connecting means upon movement of said piston toward said rear end of said housing; and sealing means provided for engagement with said face surface of said front end of said housing and for pressure-tight sealing engagement to said face surface of said connecting means upon movement of said piston toward said rear end of said housing;

said clamping jaws being exchangeable by clamping jaws of different shape.

* * * * *